United States Patent

[11] 3,595,533

| [72] | Inventor | Fritz Sutter |
| | | Pratteln, Switzerland |
| [21] | Appl. No. | 735,295 |
| [22] | Filed | June 7, 1968 |
| [45] | Patented | July 27, 1971 |
| [73] | Assignee | Buss A.G. |
| | | Basel, Switzerland |
| [32] | Priority | June 13, 1967 |
| [33] | | Switzerland |
| [31] | | 8534/67 |

[54] MIXING AND KNEADING DEVICE
3 Claims, 5 Drawing Figs.

[52] U.S. Cl. .................................................. 259/40,
    18/12, 259/5, 259/102
[51] Int. Cl. .................................................. B01f 7/08
[50] Field of Search ........................................ 259/5, 9,
    10, 21, 102, DIG. 13, DIG. 14, 25, 26, 45, 46, 109,
    110; 18/12 DR, 12 SA, 12 SI, 12 SP, 12 SR, 12 SE,
    12 SH, 12 SJ, 12 SS, 12 ST

[56] References Cited
UNITED STATES PATENTS

| 3,008,184 | 11/1961 | Fritsch ........................ | 18/12 SS |
| 3,023,455 | 3/1962 | Geier et al. ..................... | 18/12 SA |
| 3,114,171 | 12/1963 | Colombo ........................ | 18/12 SP |
| 3,219,320 | 12/1965 | Sutter ........................... | 259/5 |
| 3,346,242 | 10/1967 | List ............................. | 259/5 X |
| 3,367,635 | 2/1968 | Gresch .......................... | 18/12 SN |

*Primary Examiner*—Edward L. Roberts
*Attorney*—Abraham A. Saffitz

ABSTRACT: A mixing and kneading apparatus adapted for producing homogeneous mixtures of powdered plastic materials, such as polyvinyl chloride, polyolefins and finely divided rubber, with liquid plasticizer comprising an elongated hollow kneading shaft, a horizontal casing with a feeding hopper at one end in which conveying, kneading, mixing, homogenizing and plasticizing take place in sequential zones along the kneading shaft which is simultaneously rotated and oscillated within the casing by motor, gear and drive means to reciprocate the shaft forward and backward for each revolution, and a jacket about the casing which is adapted for heating or cooling one or more of the zones. A receiver at the end of the casing remote from the hopper is provided with a rotary cutting device to chop the plasticized stream into granulated particles which are conveyed pneumatically into an outlet pipe.

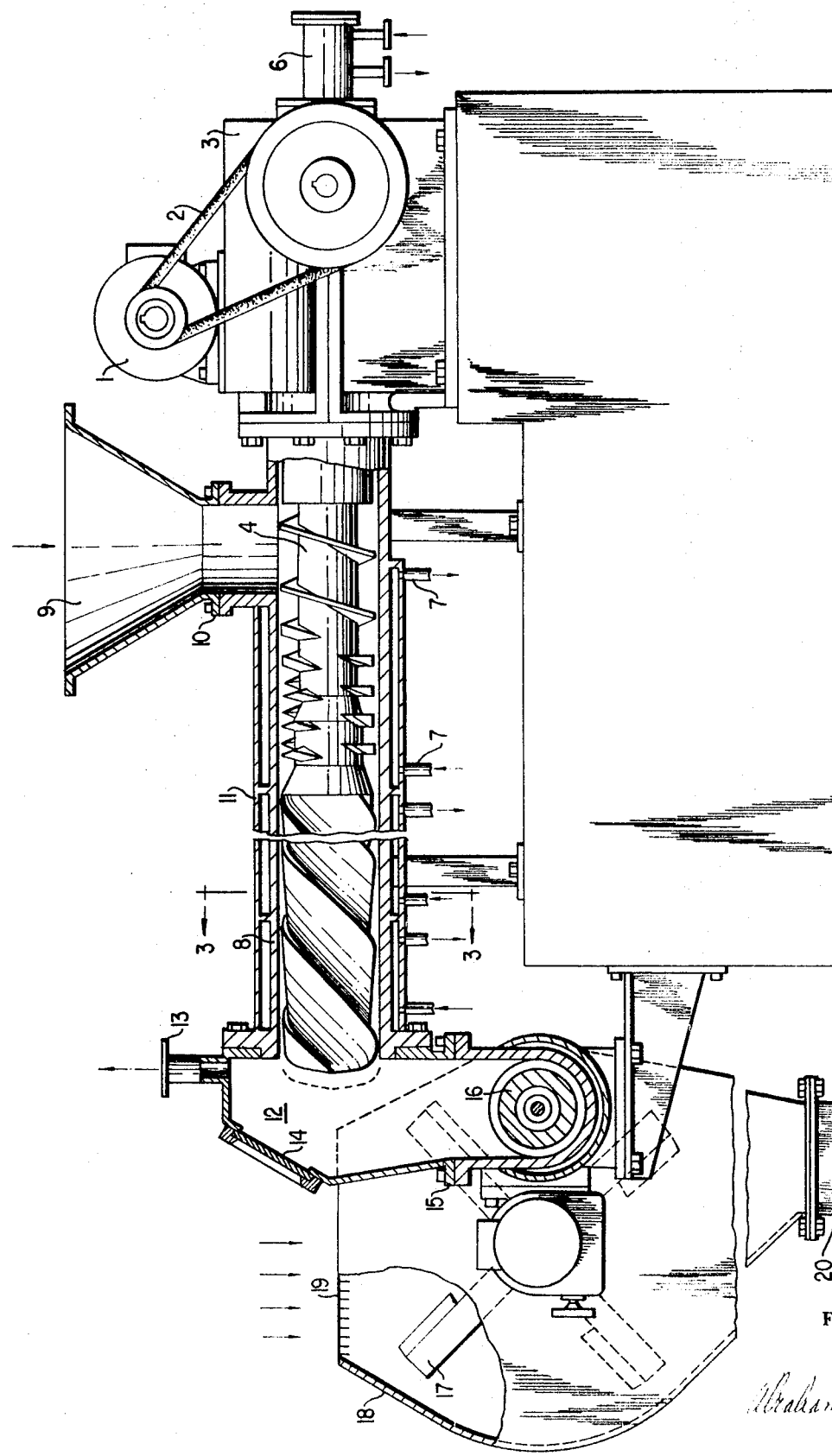
FIG. I
INVENTORS
FRITZ SUTTER
ATTORNEYS

INVENTORS
FRITZ SUTTER
ATTORNEYS

INVENTORS
FRITZ SUTTER

BY
ATTORNEYS

MIXING AND KNEADING DEVICE

The present invention concerns a jacketed mixing and kneading apparatus for the homogenization and degassing of viscous plastic substances to form a plasticized mass which is adapted to be chopped into granules and pneumatically conveyed to an outlet pipe. The mixing and kneading apparatus of the present invention has a hollow longitudinal shaft driven by motor, gear and drive means for rotating and simultaneously oscillating within a jacketed housing whereby a mixture of powdered plastic material and liquid plasticizer fed into the casing through a feeding hopper at one end is carried sequentially along a conveying zone, a kneading and mixing zone and a homogenizing and plasticization zone, these zones extending horizontally along said shaft so that the plasticized mass exits from the apparatus at the end of the shaft remote from the feeding hopper. It is important during the manufacture of granular plastic material formed by mixing powdered plastic and liquid plasticizer that the mechanical working of the mixture be carried out in such manner that the mixture does not entrap or imbibe bubbles of gas or moisture during the blending of the ingredients or from the atmosphere. Very often air and moisture are already present in the plastic powder which is fed to the mixing and kneading device. Also the formation of gas can take place during the mixing of powdered plastic and liquid plasticizer due to chemical action which can occur because of minor impurities. Both types of gas incorporation, chemical and physical, require that steps be taken to eliminate the resulting porosity. Since the product is more often than not so viscous that only a few bubbles of gas reach the surface, the degassing of the homogenized liquid mixture causes particularly difficult problems. The use of damming rings in the kneading zone has already been proposed in order to eliminate these gas bubbles but this proposal causes a thin tubular liquid layer to pass between the damming ring and the shaft of the kneader. If the layer is thin enough, the gases can escape into the atmosphere or can be exhausted by means of a vacuum pump.

The use of damming rings however has the disadvantage that the layer must have a given minimum thickness, as otherwise the passage would become too small and the pressure of damming become too great. The object of the invention is to provide a mixing and kneading device, which has an homogenizing and plasticizing zone, and in which the thickness of the liquid layer between the damming ring and the shaft of the kneader is considerably reduced whereby small particles in the mixture which would ordinarily pass unaltered through the damming ring, are ground down and homogenized by the kneading shaft.

According to the present invention a mixing and kneading device is provided for the homogenization and degassing of viscous plastic substances, comprising a shaft, rotating and simultaneously oscillating, in a casing the length of the shaft defining a conveying zone, a kneading and mixing zone and an homogenizing and plasticizing zone, the improvement being characterized in that, the homogenizing and plasticizing zone includes degassing and plasticizing members with damming surfaces which are distributed on the periphery of the shaft. These damming surfaces define wedge-shaped spaces and the kneading shaft is provided with spiral-shaped rills adjacent the wedge-shaped spaces, said rills forming a subsequent degassing zone which is connected to a vacuum chamber.

Embodiments of the subject matter of the invention are shown on the attached drawing by way of example only and in which:

FIG. 1 shows a sectional view of a mixing and kneading device of the present invention.

Figure 2A:
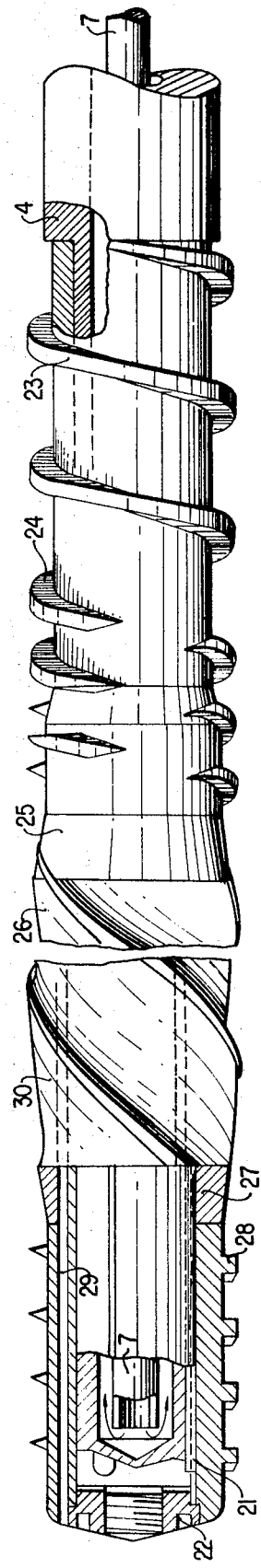
FIGS. 2a, 2b and 2c illustrate modifications of the kneading shaft having varying lengths of the plasticizing zone and having modifications of the rills to facilitate degassing; and, FIG. 3 shows a cross section along line 3—3 of FIG. 1 through the shaft and casing in the degassing, plasticizing and homogenizing zones.

The mixing and kneading machine shown in FIG. 1 is provided with an electric motor 1 which drives a gear 3 by means of a belt drive 2. The gear 3 is connected to the kneading shaft 4, which receives a simultaneous movement of rotation and oscillation in such a manner that, on each revolution of the shaft the same is moved forward and backward by the stroke S. The kneading shaft 4 is hollow and may be heated or cooled with a suitable medium. The feeding and draining of the medium takes place via stuffing-box system 6.

Figure 2B:
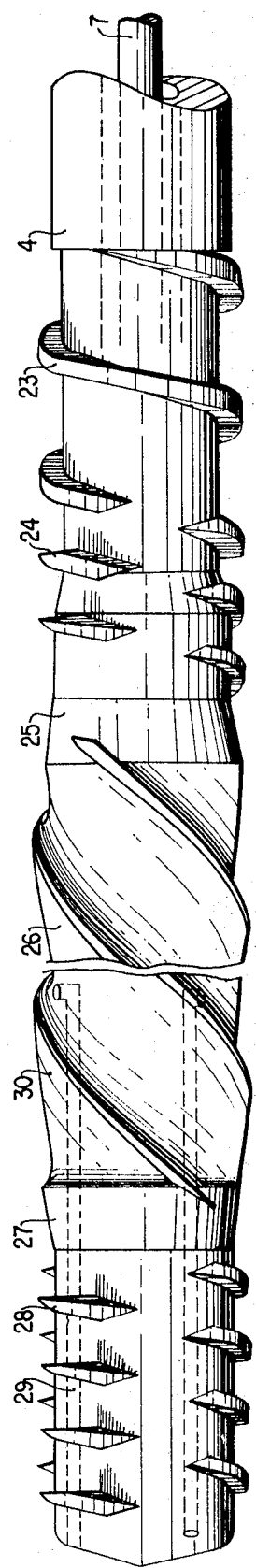
Figure 2C:
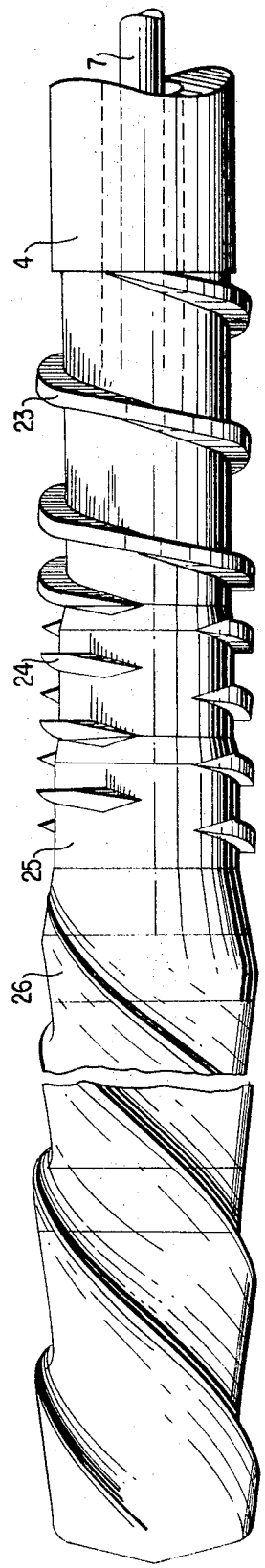

The apparatus further includes a shaft casing 8 and this casing is connected to the drive mechanism to permit the kneading shaft 4 within the casing to be driven by the gear 3. At one end, in the vicinity of the gear 3 the shaft casing is provided with a filling hopper 9 which communicates with the filling aperture 10 of the casing 8 by means of a flange and bolts. The kneading shaft is illustrated in FIGS. 2a, 2b and 2c and is so designed that the product to be worked is passed through a conveying zone Z1, a kneading and mixing zone Z2, a homogenizing and plasticizing zone Z3 and through a further mixing or plasticizing zone Z4. The construction of the kneading shaft will be described hereinafter. The casing 8 for the shaft is provided with a jacket 11 which is likewise divided into zones which may be cooled or heated independently. Suitable pipe attachments 7' serve for the feed or drainage of a heating or cooling medium. The end of the casing 8 of the kneader remote from the hopper 9 is provided with an intermediate casing 12, which is connected in airtight manner to the casing of the kneader and has a neck 13 for attachment to a vacuum pump (not shown). An inspection window 14 on the front of the intermediate casing 12 allows the processes in the intermediate casing to be observed. The lower end of the vertical intermediate casing 12 has a flange 15 for the airtight connection of the casing 12 to the casing of a discharge worm 16 so that the homogenized mixture of powdered plastic and liquid plasticizer which exits from the plasticizing zone 4 in the form of a stream may be chopped or cut by rotary cutting means 18 in a receiver 18' below the end of the horizontal casing 8 which is remote from the hopper 9. This rotary cutting means 18 is of a conventional type and serves to granulate the plasticized stream which exits from the kneading shaft through the vertical intermediate casing 12 and comprises motor driving means (not shown) and rotating cutting blades 17 which are arranged in the receiver 18, the granulate being conveyed by a strong air stream entering the top of the receiver through the apertures 19 and being pneumatically conveyed under the influence of gravity into exit pipe 20. The detailed features of the forwarding or conveying means at zone Z1, the kneading and mixing means at zone Z2 and the plasticizing and homogenizing means at zone Z3 of the kneading shaft can be seen in the modifications illustrated in FIGS. 2a, 2b and 2c. The kneading shaft 4 in all of the FIGS. is designed as a hollow shaft and has a central pipe 7 for carrying a heating or cooling fluid to one or more of the zones which aides in mixing the ingredients by the action of heat and aids in the discharging of the plasticized stream by the action of cold. In accordance with the principle of unit construction various annular parts as shown in FIGS. 2a, 2b and 2c and 3 are pushed and fitted onto the shaft. The connection of annular parts to the shaft is illustrated for the mounting of kneading and mixing interrupted thread portions 24 shown in FIGS. 2a, 2b and 2c and in section in FIG. 3, these thread portions being tapered and carrying out the function of kneading and mixing in zone Z2 and the threads being relatively close to each other in comparison with the spacing of the continuous spiral flights of the conveyor flights 23 and the even wider separation between the flights in the forwardly angled helical spiral part 26 which carries out the plasticizing function in zone Z3. The connection of the interrupted thread portion 24 to the kneading shaft 4 is by means of two wedges 21 and three shaft nuts 22 as shown in sectional view in FIG. 3. In the direction of movement of the product being worked, annular parts are designed to form the first zone near the hopper inlet and to form the forwarding worm 23. Kneading and mixing member 24 follow thereafter as a worm having an interrupted thread and a transition ring 25 follows, this ring having no flights, threads or annular parts attached thereto and permitting a smooth transition between kneading and homogenizing at the Z2 and Z3 zones respectively. The parts 26 form plasticizing and homogenizing elements and also aid degassing. Beyond these forwardly angled helical homogenizing parts 26 as shown in FIGS. 2b and 2c there may be provided a second set of mixing and kneading elements 28 and between this second set of parts 28 and the parts 26 the kneading shaft is free of helical projections to form a zone of transition which is identified as a transition ring 27. Bores 29 as shown in FIGS. 2b and 2c run in the longitudinal direction of the shaft in order to form communicating channels between the plasticized stream emerging from zone Z3 at parts 26 and the intermediate casing 12.

Figure 3:
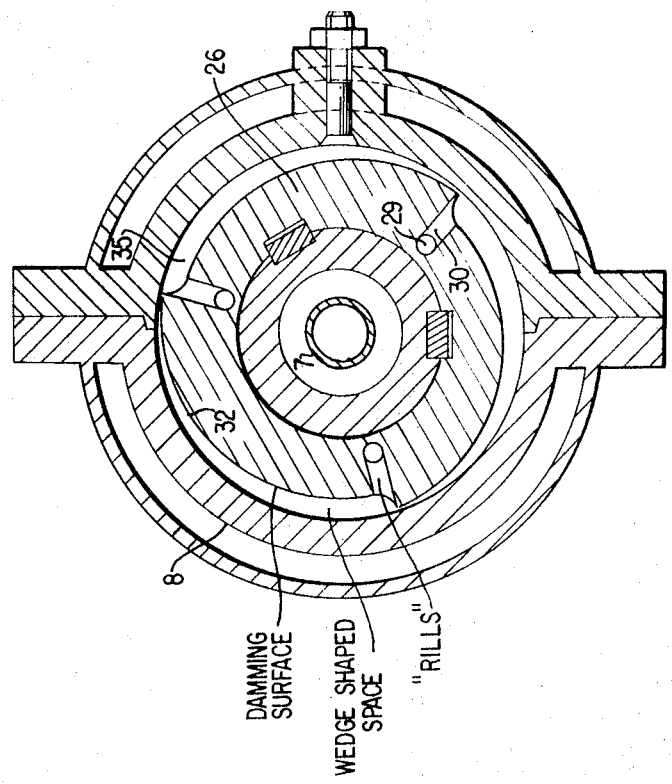

The detailed design of the said elements 26 in the degassing, plasticizing and homogenizing zones can be seen in FIG. 3 which bears legends identifying the plurality of damming surfaces 32, the wedge-shaped space between the damming surfaces and casing, and the rills 30 serving as passageways to the vacuum source. The degassing and plasticizing element 26 has three damming elements 32 distributed around the periphery of the casing and wedge-shaped spaces remain between lower surfaces of the damming elements 32 and the casing 8, into which the product to be worked is drawn and intensively ground ans plasticized. The elements 26 also have rills 30 which are in communication with the aforesaid bores 29. The product in the wedge-shaped spaces is under high pressure which suddenly collapses at the start of the rills 30. The produce emerges from the narrow passage as a very thin layer of great width, so that, with vacuum means connected to neck 13, an intensive degassing results. The layer remains first of all on the outside in the vicinity of the inner wall of the casing, while the movable gas escapes in the rills and arrives through the bores 29 or directly along the rills into the intermediate casing 12. Both the damming surfaces 32 and the rills 30 are designed as the spiral line whose pitch is such that the product is forwarded in the drawing to the left, if the shaft 4 moves to the right by the stroke 5. In this way a constant movement of the product is guaranteed. It should further be explained that the substantial difference in pressure between the wedge-shaped spaces and the rills, essential for satisfactory degassing, does not cause any binding of the shaft and thus friction with the casing, as the pressure forces cancel out mutually.

The shaft shown in FIG. 2a is intended for the working of plastics powder, such as P.V.C. polyolefine, rubber and rubberlike substances. The shaft shown in FIG. 2b is of similar design to the first one, but has a longer plasticizing zone, so that not only plastic powder, but also granulate may be worked. At the same time the depth of the rills can be selected to suit the product to be worked. The shaft shown in FIG. 2c is especially suited for degassing and has a degassing zone extending to the end of the shaft. As the volume of the product decreases with increasing degassing, it is often convenient, to have the rills deeper at the entry, i.e. after the transition ring 25, than on emergence from the degassing zone.

What I claim is:

1. A mixing and kneading apparatus for producing homogeneous mixtures of powdered plastic material such as polyvinyl chloride, polyolefin and finely divided rubber with liquid plasticizer, comprising:
   a. an elongated kneading shaft;
   b. a horizontal casing about said kneading shaft;
   c. a feeding hopper at one end of said shaft and said casing for introducing powder and liquid;
   d. a receiver at the other end of said shaft and said casing where the plasticized mixture is discharged, said receiver having a neck for attachment to a vacuum;
   e. said kneading shaft having, in sequence, four longitudinal zones between said hopper and said receiver, namely, a conveying zone formed by continuous spiral flights on the shaft, a kneading zone formed by interrupted threads on said shaft, a homogenizing zone formed by widely spaced helical flights of forwardly angled configuration on said shaft, and a degassing zone;
   f. said degassing zone being formed by symmetrical deformation in said kneading shaft;
   g. said symmetrical deformations forming damming surfaces which are spaced from the interior wall of said casing by a plurality of wedge-shaped spaces symmetrically disposed about said shaft;
   h. said shaft having a plurality of bores and rills, said rills communicating with said bores and said bores being adapted for evacuation by vacuum means to withdraw gases is said wedge-shaped spaces which pass therefrom to said rills and thereby degas the stream of plasticized mixture being kneaded in said wedge-shaped spaces; and,
   i. motor, gear and drive means to reciprocate the shaft backward and forward for each revolution of said shaft.

2. An apparatus as claimed in claim 1, wherein said kneading shaft is hollow and is fitted with a pipe at one end thereof for a heating or cooling fluid and said casing is fitted with a surrounding jacket adapted to heat the entire length thereof.

3. An apparatus as claimed in claim 2, wherein said receiver is provided with a rotary cutting means fitted with blades which cut the plasticized stream into granules and is further provided with pneumatic means to assist in the discharge of the granules.